Figure 1:
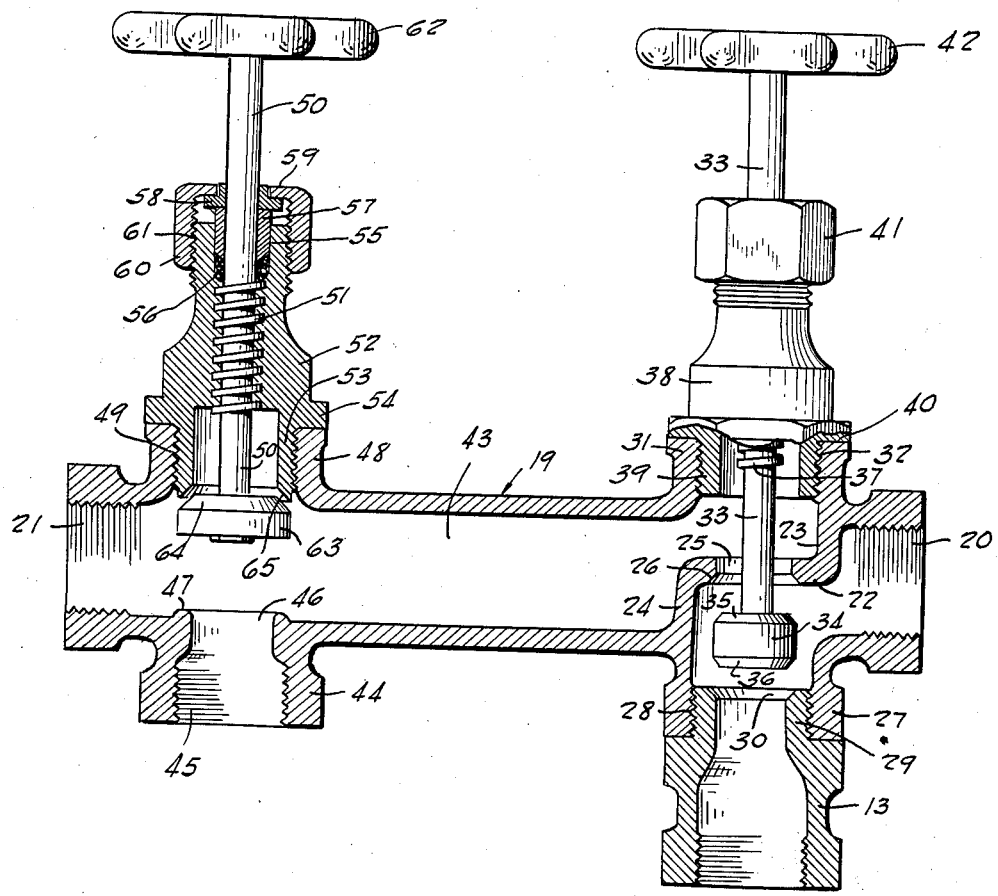

Aug. 8, 1939.　　　F. R. GOEHRING　　　2,169,043
BYPASS VALVE
Filed Nov. 8, 1937　　　2 Sheets-Sheet 1

INVENTOR.
FRANCIS RUDOLPH GOEHRING.
BY Joshua R H Potts
ATTORNEY.

Aug. 8, 1939.   F. R. GOEHRING   2,169,043
BYPASS VALVE
Filed Nov. 8, 1937   2 Sheets-Sheet 2
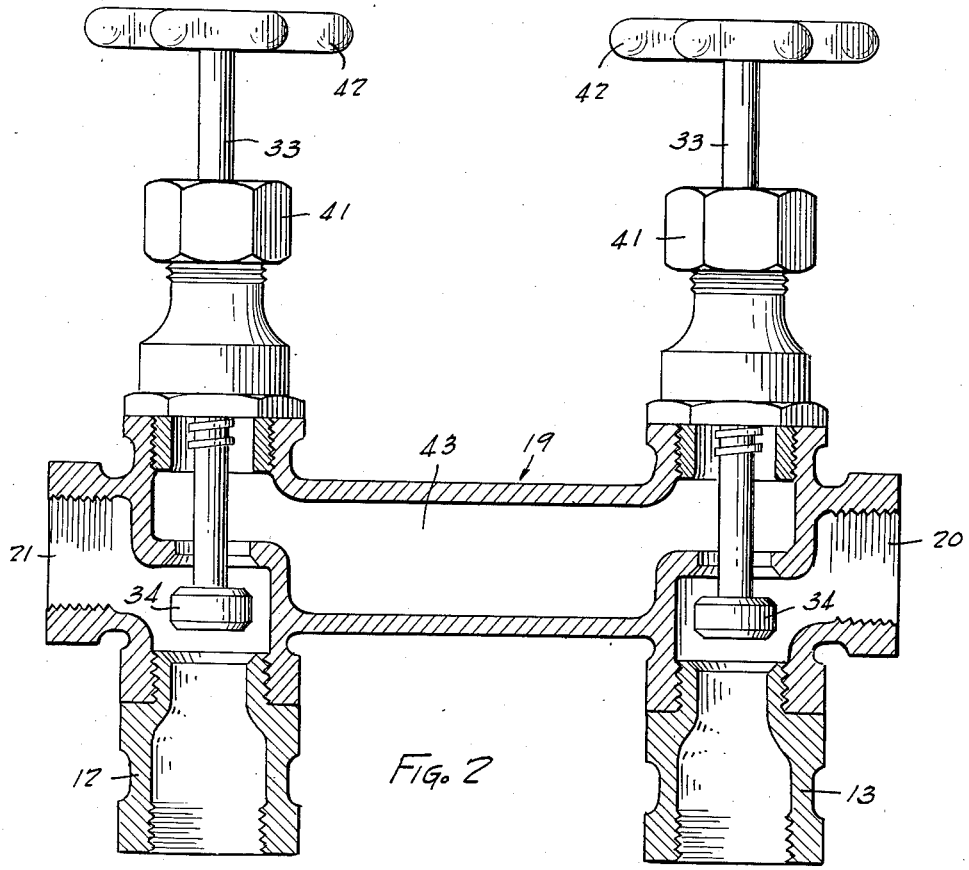
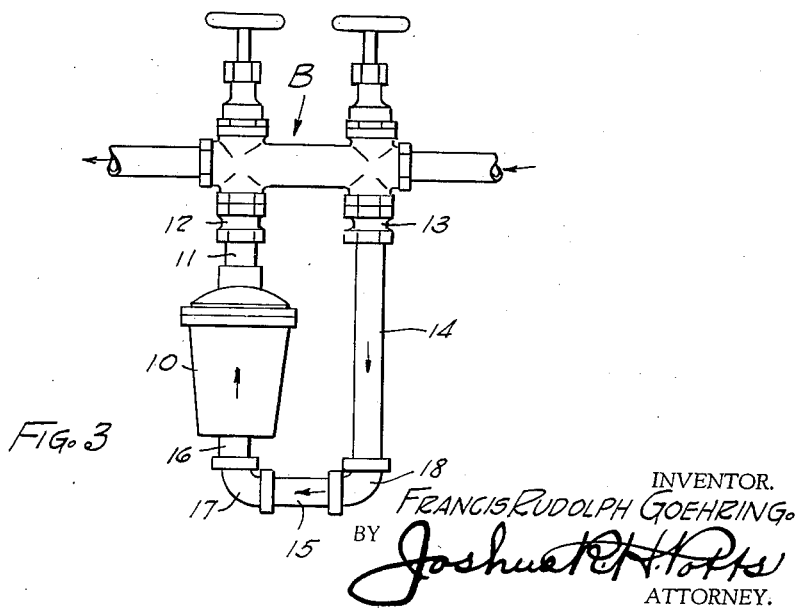
INVENTOR.
FRANCIS RUDOLPH GOEHRING.
BY Joshua R. H. Potts
ATTORNEY.

Patented Aug. 8, 1939

2,169,043

UNITED STATES PATENT OFFICE 2,169,043

BYPASS VALVE

Francis Rudolph Goehring, Philadelphia, Pa., assignor to H. Belfield Company, Philadelphia, Pa., a corporation of Pennsylvania Application November 8, 1937, Serial No. 173,382

1 Claim. (Cl. 277—57)

This invention has to do with valves of the bypass type, and is concerned primarily with improvements in a bypass valve of the character illustrated and described in Schaefer patent, No. 1,417,770, dated May 30, 1922.

The bypass valve of the above identified Schaefer patent was designed primarily for the purpose of simplifying the various conduits, coupling elements and connections required to provide a bypass for a piece of equipment such as a trap. This Schaefer patent presented a marked improvement over the prior art in that the installation of the bypass hook-up was greatly simplified, and the operations necessary to open and close the bypass were also reduced in complexity in that only three valves were involved in the opening and closing of the bypass.

The present invention has for its primary object the provision of a bypass valve of the type shown in the Schaefer patent which is of even greater simplicity, and which may be operated to open and close the bypass with fewer operations than are required even in the valve of the Schaefer patent.

In attaining this objective this invention contemplates a bypass valve which includes only two valve elements, with an operating member for each of these valve elements.

The invention has in view, as a further objective, the provision of a bypass valve of the character above noted in which the operating members for the valve elements readily and definitely indicate the condition of the bypass as to being open or closed.

In carrying out the above noted objectives in a practical embodiment the invention proposes the use of a valve casing which includes at one end a "three-way" valve which in one position establishes communication from the main line, such as the steam line, to the trap, and in its other position establishes communication between the main line and the bypass. The other end of the valve may include either a "three-way" valve which is a substantial duplicate of that above described, or an ordinary cross valve of the type shown in the Schaefer patent may be employed instead of this second "three-way" valve.

Various other more detailed objects and advantages such as arise in connection with carrying out the above noted objects in a practical embodiment, will in part become apparent, and in part be hereinafter stated, as the description of the invention proceeds.

The invention, therefore, comprises a bypass valve which is characterized as including two and only two valve elements at least one of which is a "three-way" valve, together with operating members therefor.

For a full and more complete understanding of the invention reference may be had to the following description and accompanying drawings, wherein Figure 1 is a view taken as a section through a bypass valve in accordance with the precepts of this invention, Figure 2 is a view similar to Figure 1 of one modification, and Figure 3 brings out the manner in which either of the bypass valves shown in Figures 1 and 2 is connected up with a piece of equipment such as a trap.

Referring now to the drawings, wherein like reference characters denote corresponding parts, it is first noted that Figure 3 develops a piece of equipment which is illustrated diagrammatically and which is intended to represent that piece of equipment which is to be bypassed, such as a trap. This is identified at 10.

The bypass valve of the trap 10 is shown in Figure 3, and referred to in its entirety by the reference character B. The bypass valve B is connected with the top of the trap 10 by a piece of tubing 11; a coupling 12 establishing the connection of the tubing 11 with the valve B. At the opposite end of the bypass valve B is another coupling 13 that connects a tubular conduit 14 therewith. This tubular conduit is connected to the underside of the trap 10 by connections including tubes 15 and 16, and elbows 17 and 18.

The bypass valve B shown in Figure 3 may take either of the forms illustrated in Figures 1 and 2. Referring now to Figure 1, the valve B is shown as comprising a main casting 19 which may be made from any appropriate metal. At one end the casting 19 is interiorly threaded as shown at 20, for connecting the same to any appropriate fluid conducting line, such as a steam supply line. At the other end the casting 19 is similarly threaded, as shown at 21, for connecting the same to the tubular line which is to conduct the steam or other fluid to the desired point of usage.

Adjacent the threaded end 20 the casting 19 is formed with a web 22 that extends substantially in a plane parallel to the axis of the casting; the web 22 being integrally connected to the upper part of the casting by the wall structure shown at 23, and to the bottom part of the casting by the wall structure 24. This web 22 is formed with an opening 25, one side of which is ground to the truncated conical formation illustrated, to define a valve seat 26.

Integrally formed as a part of the casting 19 and disposed beneath the web 22 is an extension 27 that is interiorly threaded, as shown at 28. This extension 27 is cylindrical, and the axis thereof is substantially in alignment with the axis of the opening 25. The coupling member shown at 13 in Figure 3 is formed with a projection 29 that is exteriorly threaded, and screwed into the threads 28. The extremity of this projection 29 takes the form of a truncated conical valve seat 30.

Also formed integrally with the casting 19 on the upper side of the web 22 is another cylindrical extension 31 which is interiorly threaded, as shown at 32. The axis of this cylindrical extension 31 is also substantially in alignment with the axes of the opening 25 and extension 27.

A valve stem 33 is shown as extending through the extension 31 at 25, and at its lower end carries a valve member 34 that is formed on its upper side with a truncated conical surface 35 that is complemental to the valve seat 26, and on its lower side with another truncated conical surface 36 that is complemental to the conical valve seat 30. This stem 33 is threaded, as shown at 37, and is carried by a casing 38 that is formed with a threaded stud 39 that is screwed into the threads 32.

This casing 38 is flanged to provide a shoulder 40 that engages the upper end of the extension 31. The upper end of the casing may include a packing chamber of a well-known type, such as that illustrated in connection with the valve at the other end of the casting 19 (to be hereinafter described) and a packing gland 41; this simply serving to provide a proper seal between the valve stem 37 and casing 38. The upper end of the valve stem 33 carries any preferred type of operating member, such as the hand wheel shown at 42.

It is evident that the mechanism above described constitutes a "three-way" valve. With the surface 35 of the valve member 34 fitted in the conical valve seat 26 of the opening 25, communication between the opening at 20 and the bypass of the casting 19, which is identified as 43, is cut off, while communication from the threaded opening 20 to the coupling member 13 in the cylindrical extension 27 is established. Thus steam or other fluid is conducted through the coupling member 13, conduits 14, 15 and 16 to the underside of the trap 10.

However, by availing of the operating member 42 the valve stem 33 may be rotated to lower the valve member 34, so that the opening 25 is opened, while the surface 36 is seated on the conical valve seat 30 to close the opening of the coupling 13, thus establishing communication from the threaded opening 20 to the bypass 43.

In the form of the invention shown in Figure 1, the opposite end of the casting 19 includes structure and assembled mechanism which constitutes a well-known type of cross valve. This structure comprises a cylindrical extension 44 formed on the underside of the casting 19, and which is interiorly threaded, as shown at 45, for connection with the coupling member 12.

An opening is formed on the wall of the casting 19 to establish communication between the extension 44 and the interior of the casting 19. This opening is identified at 46, and is shown as being lined with a rounded peripheral flange 47 that constitutes a valve seat. Substantially opposite the extension 44 and on the upper side of the casting 19 is formed another cylindrical extension 48 that is interiorly threaded, as shown at 49. This extension 48 defines an opening which is substantially coaxial with the opening 26.

A valve stem 50 is shown as having threads 51 that are threaded into a casing 52 which is formed with a projection 53 that is exteriorly threaded and screwed into the threads 49. The casing 52 is formed with a flange 54 that abuts the upper end of the extension 48. At the upper end of the casing 52 there is formed a recess 55 in which is received packing 56. A packing gland 57 of a well-known type is received in the recess 56 about the stem 50 and is formed with a flange 58.

Engaging the flange 58 is a complemental flange 59 formed on a thimble 60 which is threaded on to the exterior of the casing 52, as shown at 61.

At the upper end the valve stem 50 carries an operating member such as the hand wheel 62, while at its lower end the stem 50 carries a valve member 63. The upper surface of this valve member is formed with a truncated conical surface 64 that is adapted to be seated in a complemental truncated conical surface 65 formed on the lower extremity of the projection 53.

The underside of the valve member 63 is adapted to be seated on the valve seat 47 in one position of the valve to cut off communication with the coupling 12 and conduit 11, and establish communication through the bypass 43. However, in the uppermost position of the valve member 63 the surface 64 engages the seat 65 to provide a seal against steam or other fluid escaping up past the valve stem, and thus deleteriously attacking the packing between these parts.

From the foregoing it is evident that with both of the hand wheels 42 and 62 screwed to their downwardmost limit of movement communication to the couplings 12 and 13 is closed, and communication through the bypass 43 established. However, with both of these hand wheels 42 screwed to their uppermost positions communication through the bypass 43 is cut off, while the conduits and associated connections leading to the trap 10 are placed in communication with the steam lines that are connected to the ends of the casting at 20 and 21.

Referring now more particularly to Figure 2, the construction of the "three-way" valve in the threaded end 20 is duplicated, and is the same as that shown in Figure 1. However, at the other end of the casting 19 the cross valve shown in Figure 1 is replaced by another "three-way" valve which is a substantial duplicate of that shown at the opening 20.

Inasmuch as these "three-way" valve structures and assemblies are exact duplicates, they need not be described here in detail. It suffices to say that when the bypass 43 is to be closed it is closed off at both ends in the form shown in Figure 2, whereas this is not true in the form of the invention shown in Figure 1.

While preferred specific embodiments of the invention are hereinbefore set forth it is to be clearly understood that I am not to be limited to the exact constructions illustrated and described, because various modifications of these details may be provided in putting the invention into practice within the purview of the appended claim.

I claim:

In combination with a piece of equipment which is to be provided with a bypass, a bypass valve assembly and connections between the bypass valve assembly and the piece of equipment, said bypass valve assembly comprising a casing formed with inlet and outlet openings, said casing also being formed with openings adjacent said inlet and outlet openings and which openings are connected to said piece of equipment by the said connections, said casing also defining a bypass between the inlet and outlet openings, a "three-way" valve opening on the inlet side of the casing, a cross valve at the outlet side of the casing, and individual operating members for said "three-way" and cross valves.

FRANCIS RUDOLPH GOEHRING.